United States Patent [19]
Akiyama et al.

[11] Patent Number: 6,159,394
[45] Date of Patent: Dec. 12, 2000

[54] STRESS EMISSION MATERIAL AND ITS MANUFACTURING METHOD

[75] Inventors: Morito Akiyama; Chaonan Xu; Kazuhiro Nonaka; Tadahiko Watanabe, all of Tosu, Japan

[73] Assignee: Agency of Industrial Science and Technology, Tokyo, Japan

[21] Appl. No.: 09/245,303

[22] Filed: Feb. 5, 1999

[30] Foreign Application Priority Data

Aug. 12, 1998 [JP] Japan .................................. 10-242521

[51] Int. Cl.[7] .......................... C09K 11/08; C09K 11/55; C09K 11/56; C09K 11/64; C09K 11/00
[52] U.S. Cl. ............................. 252/301.4 R; 252/301.45; 252/961; 250/493.1; 116/212
[58] Field of Search ....................... 252/301.45, 301.4 R, 252/961; 250/493.1; 116/212

[56] References Cited

U.S. PATENT DOCUMENTS 2,630,534  3/1953  Heinecke et al. ................ 252/301.4 R
4,649,227  3/1987  Tributsch et al. ....................... 136/252

FOREIGN PATENT DOCUMENTS 48-46582  7/1973  Japan .
2232119  12/1990  United Kingdom .

*Primary Examiner*—C. Melissa Koslow
*Attorney, Agent, or Firm*—Oblon, Spivak, McClelland, Maier & Neustadt, P.C.

[57] ABSTRACT

The present invention provides a new stress emission material that is different from the other known materials and that efficiently emits light when subjected to a mechanical external force such as a frictional force, a shear force, an impact, or a pressure. This stress emission material is configured by adding an emission center comprising one or more rare earths or transition metals that emit light when electrons excited by a mechanical force return to their normal state, to a base material comprising one or more of an oxide, a sulfide, a carbide, and a nitride each having an $FeS_2$ structure. This material has an emission intensity that depends on stress.

7 Claims, 1 Drawing Sheet

STRESS EMISSION MATERIAL AND ITS MANUFACTURING METHOD

FIELD OF THE INVENTION

The present invention relates to a new stress emission material that emits light when subjected to a mechanical external force as well as a method for manufacturing this material.

DESCRIPTION OF THE PRIOR ART

Certain substances emit visible radiation under an external stimulus near room temperature. This is a well-known phenomenon called fluorescence. A substance that exhibits fluorescence, that is, a phosphor, is used in illuminating lamps such as fluorescent lamps or displays such as CRTs (Cathode Ray Tubes).

The external stimulus that causes fluorescence is normally provided using ultraviolet rays, electron beams, X-rays, radiation, electric fields, or chemical reaction. Few materials, however, are known that emit light when subjected to a mechanical external force (triboluminescent).

SUMMARY OF THE INVENTION

The inventors researched materials that emit light when subjected to a mechanical external force instead of stimuli provided using ultraviolet rays, electron beams, X rays, radiation, electric fields, or chemical reaction. As a result, the inventors have determined the appropriate amount of emission center added to a base material with an $FeS_2$ structure and a doping method therefor, thereby succeeding in significantly improving the efficiency in converting mechanical energy into optical energy.

The present invention is based on this knowledge and its technical object is to provide a new stress emission material that is different from the other known materials and that efficiently emits light when subjected to a mechanical external force such as a frictional force, a shear force, an impact, or a pressure, and a manufacturing method for said material.

A stress emission material according to this invention provided to achieve the above object is characterized in that an emission center comprising one or more rare earths or transition metals that emit light when electrons excited by a mechanical force return to their normal state is added to a base material comprising one or more of an oxide, a sulfide, a carbide, and a nitride each having an $FeS_2$ structure.

In addition, a method for manufacturing the stress emission material according to this invention is characterized by adding 0.01 to 20 wt. % of emission center comprising one or more rare earths or transition metals that emit light when electrons excited by a mechanical force return to their normal state, to a base material comprising one or more of an oxide, a sulfide, a carbide, and a nitride each having an $FeS_2$ structure; mixing the base material and the emission center together; and burning the mixture in a reducing atmosphere at 800 to 1,700° C. to dope the emission center.

Thus, this invention can provide a new stress emission material that can efficiently emit light when subjected to a mechanical external force such as a frictional force, a shear force, an impact, or a pressure and can also provide the method for manufacturing this material. This invention can also directly convert the mechanical external force into light due to emission from the material on which this force acts. Thus, this material is expected to have various applications, including use as a completely new optical element.

DESCRIPTION OF EMBODIMENTS

Figure 1:
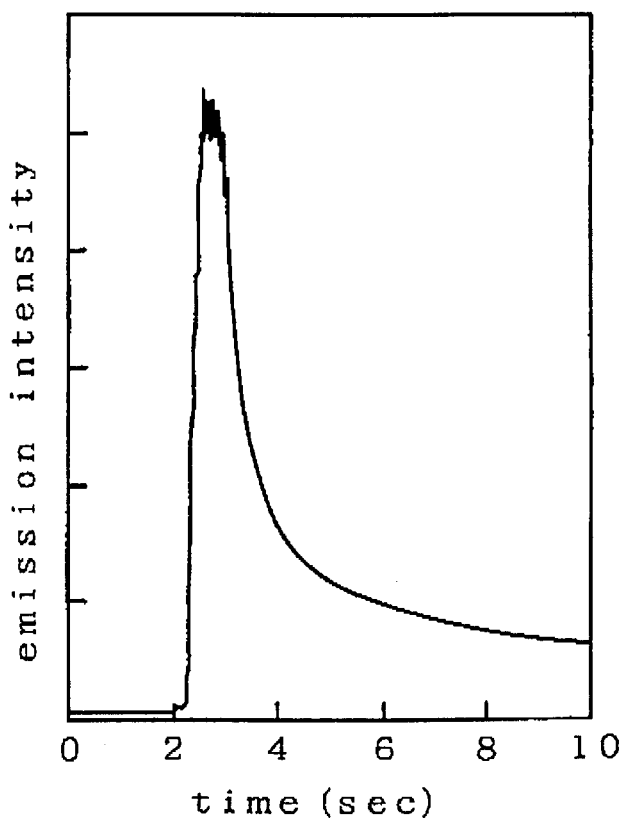
FIG. 1 is a graph showing a stress emission behavior observed when a mechanical working force is applied to a pellet-like sample ($Sr_3Al_2O_6$:Eu) according to this invention.

A stress emission material according to this invention is formed by adding an emission center to a base material. A suitable base material is a substance with an $FeS_2$ structure, and specifically a material consisting of one or more of an oxide, a sulfide, a carbide, and a nitride each having the $FeS_2$ structure. It has been found that the use of these substances increases the emission intensity compared to other substances. Although the base material is selected from them, in terms of the $FeS_2$ structure, a suitable material mainly consists of one or more components selected from a group consisting of $Sr_2Al_2O_6$, $Ca_3Al_2O_6$, $CaC_2$, $CoS_2$, $MnS_2$, $NiS_2$, $RuS_2$, and $NiSe_2$, and of these components, $Sr_3Al_2O_6$ or $Ca_2Al_2O_6$ is most suitable.

In addition, the addition of an emission center to the base material can substantially improve the emission intensity. To dope the emission center, a material that constitutes the emission center is sufficiently mixed with the base material and the mixture is then burned in a reducing atmosphere at 800 to 1,700° C. or more than 30 minutes. Addition of a flux such as boron also improves the emission characteristic.

A suitable material that constitutes the emission center comprises one or more rare earth ions such as Sc, Y, La, Ce, Pr, Nd, Pm, Sm, Eu, Gd, Tb, Dy, Ho, Er, Tm, Yb, and Lu and transition metal ions such as Ti, Zr, V, Cr, Mn, Fe, Co, Ni, Cu, Zn, Nb, Mo, Ta, and W. The optimal emission center, however, varies with the crystalline structure of the base material. If the base material is, for example, $Sr_3Al_2O_6$, Eu is particularly effective, while if the base material is $Ca_3Al_2O_6$, Nd is suitable.

The amount of emission center material added can be selected from between 0.01 and 20 wt. %. If the amount is less than 0.01 wt. %, the emission intensity is insufficiently improved. On the other hand, if more than 20 wt. % of this material is used, the crystalline structure of the base material is not maintained and the emission intensity is reduced, so this amount is unsuited for practical use.

In addition, the emission intensity of the emission material depends on the nature of the mechanical working force acting as an excitation source, but it generally increases as the applied force increases. Thus, the emission intensity can be measured to determine the mechanical working force applied to the material. Accordingly, the stress effected on the material can be detected in a non-contact manner to enable the stress condition to be visualized. Therefore, this material is expected to be used in many devices such as stress detectors.

EMBODIMENT

An embodiment of this invention is shown below.

To examine the stress emission characteristic of the stress emission material according to this invention, a powder sample of this material was embedded in an epoxy resin, which was then shaped into a pellet, and the measurements described below were conducted. The powder sample was produced by adding 0.6 wt. % of Eu acting as an emission center and 1 wt. % of boron acting as a flux, to $Sr_3Al_2O_6$ acting as a base material; burning the mixture in a reducing atmosphere (Ar+$H_2$ 5%) at 1,300° C. for 4 hours; and forming the resulting stress emission material into a powder.

FIG. 1 shows the stress emission behaviour (temporal changes) observed when a 900-N mechanical working force was imparted to the pellet-like sample ($Sr_3Al_2O_6$: Eu) using a vice. The sample ($Sr_3Al_2O_6$: Eu) emitted a green light that was intense enough for visual confirmation.

Figure 2:
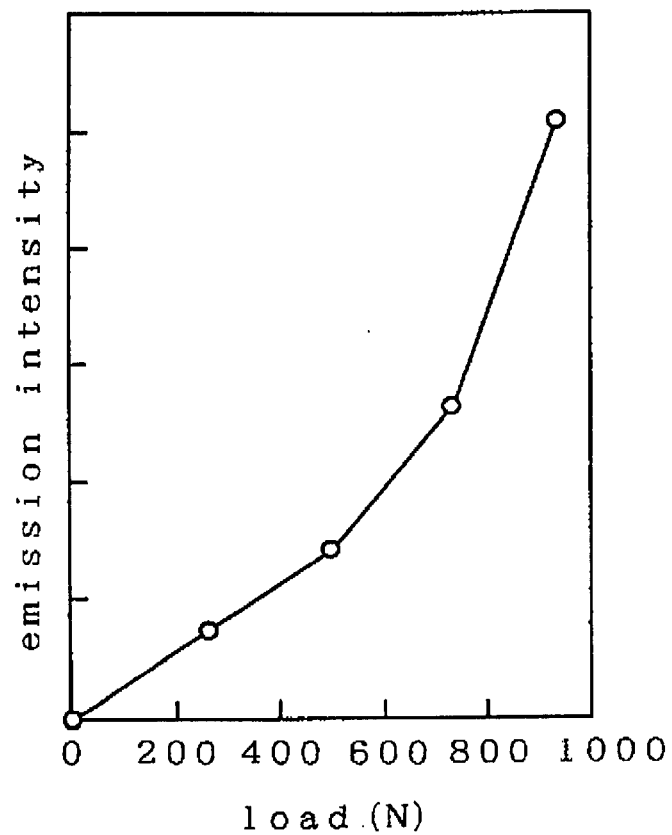
FIG. 2 is a graph showing the results of examination of the dependence on stress of the emission intensity of the pellet-like sample ($Sr_3Al_2O_6$: Eu).

FIG. 2 shows the results of examination of the dependence on stress of the emission intensity of the pellet-like sample ($Sr_3Al_2O_6$: Eu). The results indicate that due to its dependence on the stress, the emission intensity increased with increasing load. Thus, it has been found that the magnitude of the stress can be evaluated by measuring the emission intensity.

Results similar to those in FIGS. 1 and 2 were obtained when other oxides, sulfides, carbides, and nitrides each having the $FeS_2$ structure were examined.

What is claimed is:

1. A stress emission material comprising:

a base material selected from an oxide, a sulfide, a carbide and a nitride, each having a $FeS_2$ crystal structure doped with 0.01 to 20 wt. % of an emission center selected from the group consisting of rare earth metals, transition metals and a mixture thereof.

2. A stress emission material according to claim 1 wherein the base material of the $FeS_2$ structure comprises one or more components selected from a group of $Sr_3Al_2O_6$, $Ca_3Al_2O_6$, $CaC_2$, $CoS_2$, $MnS_2$, $NiS_2$, $RuS_2$, and $NiSe_2$.

3. A stress emission material according to claim 2 wherein the base material comprises $Sr_3Al_2O_6$ and the emission center comprises Eu.

4. A stress emission material according to any one of claims 1 to 3 wherein boron is added as a flux.

5. A device comprising:

a) a stress emission material comprising a base material selected from an oxide, a sulfide, a carbide and a nitride, each having a $FeS_2$ crystal structure doped with an emission center selected from the group consisting of rare earth metals, transition metals and a mixture thereof; and b) a mechanical excitation source for said stress emission material.

6. A stress emission material comprising:

a base material comprising $Ca_3Al_2O_6$ having a $FeS_2$ crystal structure doped with 0.01 to 20 wt. % of an emission center comprising Nd.

7. A method for manufacturing a stress emission material comprising the following steps:

adding 0.01 to 20 wt. % of at least one emission center selected from at least one rare earth or transition metal which emits light when the metal's electrons excited by a mechanical force return to the normal state, to a base material selected from oxides, sulfides, carbides, and nitrides each having an $FeS_2$ structure;

mixing the base material and the emission center together; and burning the mixture in a reducing atmosphere at 800 to 1,700° C. to dope the base material with the emission center.

* * * * *